(12) United States Patent
Lee et al.

(10) Patent No.: US 9,491,003 B2
(45) Date of Patent: Nov. 8, 2016

(54) METHOD AND APPARATUS FOR KEEPING ORDERS AMONG MESSAGES OF DISCRETE MEDIA TYPE IN CPM SESSION

(75) Inventors: Hyeonsoo Lee, Gyeonggi-Do (KR); Dongyoung Lee, Gyeonggi-Do (KR); Kangsuk Huh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 147 days.

(21) Appl. No.: 13/376,095

(22) PCT Filed: Jun. 10, 2010

(86) PCT No.: PCT/KR2010/003740
§ 371 (c)(1),
(2), (4) Date: Dec. 2, 2011

(87) PCT Pub. No.: WO2010/143903
PCT Pub. Date: Dec. 16, 2010

(65) Prior Publication Data
US 2012/0084377 A1 Apr. 5, 2012

Related U.S. Application Data

(60) Provisional application No. 61/186,383, filed on Jun. 12, 2009, provisional application No. 61/219,390, filed on Jun. 23, 2009.

(30) Foreign Application Priority Data

Feb. 3, 2010 (KR) .................. 10-2010-0010126

(51) Int. Cl.
*G06F 15/16* (2006.01)
*H04L 12/58* (2006.01)

(52) U.S. Cl.
CPC .................................. *H04L 12/58* (2013.01)

(58) Field of Classification Search
CPC ............................. H04L 51/36; H04L 51/38

USPC ........................................................ 709/206
See application file for complete search history.

(56) References Cited

U.S. PATENT DOCUMENTS 5,541,995 A * 7/1996 Normile et al. ................ 380/42
7,412,486 B1 * 8/2008 Petrack et al. ................ 709/206

(Continued)

FOREIGN PATENT DOCUMENTS

KR 10-2006-0067696 A 6/2006
KR 10-0643805 B1 11/2006

(Continued)

OTHER PUBLICATIONS

RFC 793—TCP (Information Sciences Institute, Sep. 1981).*
"Delta" (wikipedia.org, Oct. 8, 2008).*

*Primary Examiner* — Vivek Srivastava
*Assistant Examiner* — Nicholas Celani
(74) *Attorney, Agent, or Firm* — Birch, Stewart, Kolasch & Birch, LLP

(57) ABSTRACT

Disclosed are a method and apparatus for keeping orders among messages when transmitting and receiving messages within a Converged IP Messaging (CPM) session. A message transmission and reception method in a network comprises receiving a message including sequential identification information and a cumulative size, and outputting the received message, wherein the sequential identification information is an identifier allowing identification of orders managed within a session, transmission and reception being performed in the session, and the cumulative size is the sum of sizes of messages, the messages being sent by a subject having sent the received message within the session, wherein the output order of the received message is decided based upon the sequential identification information and sequential identification information relating to messages received prior to the received message.

2 Claims, 7 Drawing Sheets

(56) References Cited

U.S. PATENT DOCUMENTS

| | | | |
|---|---|---|---|
| 2002/0046250 A1* | 4/2002 | Nassiri | H04L 12/5875 709/206 |
| 2005/0281232 A1* | 12/2005 | Kim et al. | 370/335 |
| 2007/0257786 A1* | 11/2007 | King et al. | 340/503 |
| 2008/0052406 A1* | 2/2008 | Kong et al. | 709/237 |
| 2008/0176518 A1* | 7/2008 | Pascht et al. | 455/67.11 |
| 2008/0262991 A1* | 10/2008 | Kapoor et al. | 706/20 |
| 2008/0270629 A1* | 10/2008 | Yang et al. | 709/248 |
| 2008/0304483 A1* | 12/2008 | Williams et al. | 370/389 |
| 2009/0077254 A1* | 3/2009 | Darcie et al. | 709/231 |

FOREIGN PATENT DOCUMENTS

| | | |
|---|---|---|
| KR | 10-2008-0003966 A | 1/2008 |
| WO | WO 2005041600 A1 * | 5/2005 |
| WO | WO 2007/083291 A2 | 7/2007 |

* cited by examiner

METHOD AND APPARATUS FOR KEEPING ORDERS AMONG MESSAGES OF DISCRETE MEDIA TYPE IN CPM SESSION

This application is the National Phase of PCT/KR2010/003740 filed Jun. 10, 2010, which claims priority under 35 U.S.C 119(e) to the U.S. Provisional Application No. 61/186,383 filed on Jun. 12, 2009 and 61/219,390 filed on Jun. 23, 2009 and under 35 U.S.C. 119(a) to Patent Application No. 10-2010-0010126 filed in the Republic of Korea on Feb. 3, 2010, all which are hereby expressly incorporated by reference into the present application.

TECHNICAL FIELD

The present invention relates to a messaging service, and more particularly, a method for transferring messages of a discrete media type to a user with keeping orders among the messages, upon sending the messages in a CPM session, and an apparatus having the transfer function.

BACKGROUND ART

Converged Internet Protocol Messaging (CPM) denotes a messaging service based upon an Internet Protocol Multimedia Subsystem (IMS), and is a technique for converging and providing several services, such as an existing Short Message Service (SMS), a Multimedia Message Service (MMS), an Instant Messaging (IM) and the like, on the basis of an Internet Protocol (IP).

A CPM session is a type of chatting service for allowing a real-time message communication among users.

Types of messages to be transmitted and received in the CPM session may roughly include a discrete media type and a continuous media type. The discrete media includes audio clip, text, image and the like, and the continuous media includes audio and video. The transmission of the discrete media uses a Message Session Relay Protocol (MSRP), and the transmission of the continuous media uses a Real-time Transport Protocol (RTP).

The MSRP uses a Transmission Control Protocol (TCP) as its sub protocol. The TCP protocol ensures the arrival of packets and keeps the transmission orders among packets, so it is appropriate for an application, such as a messaging service, in which the message transmission should be guaranteed.

DISCLOSURE OF INVENTION

Technical Problem

The aforesaid MSRP session includes a single TCP connection. Thus, regarding the characteristic of the CPM in which a plurality of small messages can be sent in a short period of time, the behavior of setting the TCP connection every time one message is sent is inefficient in the aspect of time and resources.

However, upon the use of the single TCP connection, a problem may occur when a large message, for example, a file, is sent. Since all of the messages are sequentially sent by use of the single TCP connection, other messages which are small in size or needed to be preferentially sent cannot be sent until before the large messages are all sent.

As one solution of such problem, an approach may be regarded in which the transmission is realized by use of a separately established TCP connection in case where a message larger than a preset size is to be sent. However, the establishment of the new TCP connection requires communications of plural control signals between both ends, and a lot of resources are needed, for example, to maintain data, such as state information or the like, for maintaining the TCP connection. In addition, due to the characteristic of the CPM, large multimedia messages may be repeatedly transmitted and received in a short time. Examples of the multimedia message may include avatars, emoticons and the like which represent users' personalities. On those scores, the approach for establishing the separate TCP connection is not appropriate.

Hence, for the use of the MSRP, when a message larger than a predetermined size (e.g., a message in size more than 2 Kbyte) is sent, the message is divided into several chunks for transmission. For example, a first message is 2 Mbyte in size and a second message is 1 Kbyte in size, the MSRP divides the first message into a plurality of chunks and sends the same and the second message is sent while the chunks of the first message are being sequentially sent. Accordingly, each chunk is sent by being loaded in a TCP. However, this operation generates at the final client end the same effect as a simultaneous transmission of the two messages.

The characteristic of the MSRP may overcome the problem of the transmission delay of another message because of a specific large message, but have a chance of changes in the transmission orders among the messages. Consequently, a client receiving the messages may misunderstand the sequence (i.e., generated orders) among the received messages. Due to the characteristic of the CPM session, upon sending messages in the CPM session, the contents of the message should be forwarded to a user with keeping the sequence of the sent messages. However, if such messages are forwarded to the user out or order, this situation may arise the user's confusion.

Solution to Problem

Therefore, an object of the present invention is to provide a message transmission and reception method in a network, the method including receiving a message including sequential identification information and a cumulative size, and outputting the received message, wherein the sequential identification information is an identifier allowing to check (or identify) orders managed within a session, transmission and reception being performed in the session, and the cumulative size is the sum of sizes of messages, the messages being sent by a subject having sent the received message within the session, wherein the output order of the received message is decided based upon the sequential identification information and sequential identification information relating to messages received prior to the received message.

Preferably, the received message may be output after complete output of messages each having sequential identification information smaller than the sequential identification information included in the received message.

Preferably, the received message may be output either after complete output of messages each having sequential identification information smaller than the sequential identification information included in the received message, or when a size of a message, which has sequential identification information smaller than the sequential identification information of the received message but has not been output, is larger than a predefined threshold value, and the size of the non-output message may be estimated based upon the cumulative size of the received message and cumulative sizes of previously received messages.

Preferably, the message may be sent from two or more network peers, and the sequential identification information may be managed by a peer which has sent the message including the sequential identification information. The orders may be applied among messages sent by the peer, and the cumulative size may be the sum of sizes of messages which have been sent within the session by the peer which sent the message including the cumulative size.

In accordance with another aspect of the present invention, there is provided a message transmission and reception method in a message transmission and reception method among clients via a server, the method including generating by a client a message to be sent, allocating by the client sequential identification information and a cumulative size to the message to be sent, sending by the client the message to be sent to the server, the message being allocated with the sequential identification information and the cumulative size, receiving by the client a message from the server, the message including converged sequential identification information and a converged cumulative size, and outputting by the client the received message, wherein the sequential identification information may be an identifier allowing to check (or identify or recognize) orders managed by the client within a session, in which transmission and reception are performed, and the cumulative size may be the sum of sizes of messages, the messages sent by the client within the session, wherein the converged sequential identification information may be an identifier allowing to check (or identify or recognize) orders managed by the server, and the orders of the sequential identification information among messages sent by the same client may be maintained for the converged sequential identification information, wherein the converged cumulative size may be the sum of sizes of messages sent from the server, wherein the client may decide whether to output the received message based upon the converged sequential identification information of the received message and the converged sequential identification information of messages received prior to the received message.

Preferably, the received message may be output after complete output of messages, having converged sequential identification information smaller than the converged sequential identification information included in the received message but not sent by the client.

Preferably, the method may further include receiving by the client a feedback message from the server, wherein the feedback message may include information indicating converged sequential identification information allocated by the server to a message, which has been sent by the client and has specific sequential identification information.

Preferably, the received message may include sequential identification information of a message last sent by the client and feedback information indicating converged sequential identification information allocated by the server to the last sent message.

Preferably, the received message may be output either after complete output of messages, the message having converged sequential identification information smaller than the converged sequential identification information included in the received message but not sent by the client, or when a message, which has converged sequential identification information smaller than the converged sequential identification information but has not been output without transfer, has a size larger than a predefined threshold value, wherein the size of the non-output message may be estimated based upon the converged cumulative size of the received message and converged cumulative sizes of previously received messages.

In accordance with another aspect of the present invention, there is provided a message transmission and reception method in a method for receiving a message from a client and sending the message to other clients, the method including receiving a message from a client, the message including sequential identification information and a cumulative size, allocating converged sequential identification information and a converged cumulative size to the message, sending a feedback to the client, and sending the message to other clients excluding the client, wherein the sequential identification information may be an identifier allowing to check (or identify or recognize) orders managed by the client, which sent the message within a session, transmission and reception being performed in the session, and the cumulative size may be the sum of sizes of messages, the messages being sent within the session by the client, which sent the message, wherein the converged sequential identification information may be an identifier allowing to check (or identify or recognize) orders, and the orders of the sequential identification information among messages sent by the same client may be maintained for the converged sequential identification information, wherein the converged cumulative size may be the sum of sizes of messages received.

Preferably, if a message has not been received yet among messages having sequential identification information smaller than the sequential identification information of the received message, converged sequential identification information for the non-received message may be secured, wherein the converged cumulative size to be allocated to the received message may be estimated based upon the cumulative size of the received message.

The feedback may be a message separately sent to the client, and the message may include information indicating converged sequential identification information allocated to a message having specific sequential identification information.

The feedback may be included in a message, the message generated by another client to be then sent to the client, the message including sequential identification information of a message last sent by the client and information indicating converged sequential identification information allocated to the last sent message.

Advantageous Effects of Invention

Therefore, the objects of the present invention are to address the aforesaid problems.

In detail, the present invention provides a method for determining orders among messages sent within a CPM session using MSRP, and also provides a method for transferring the messages to a user according to the orders.

Also, the present invention provides a method for first transferring a message, which has been generated later but earlier sent, when a message having a size larger than a predefined threshold value has not been sent yet. The method is implemented such that even if the later generated message is earlier sent to a user, the user can be informed of existence of a message, which has first been generated but not sent to the user yet. Therefore, the method can prevent user's confusion.

MODE FOR THE INVENTION

Figure 1:
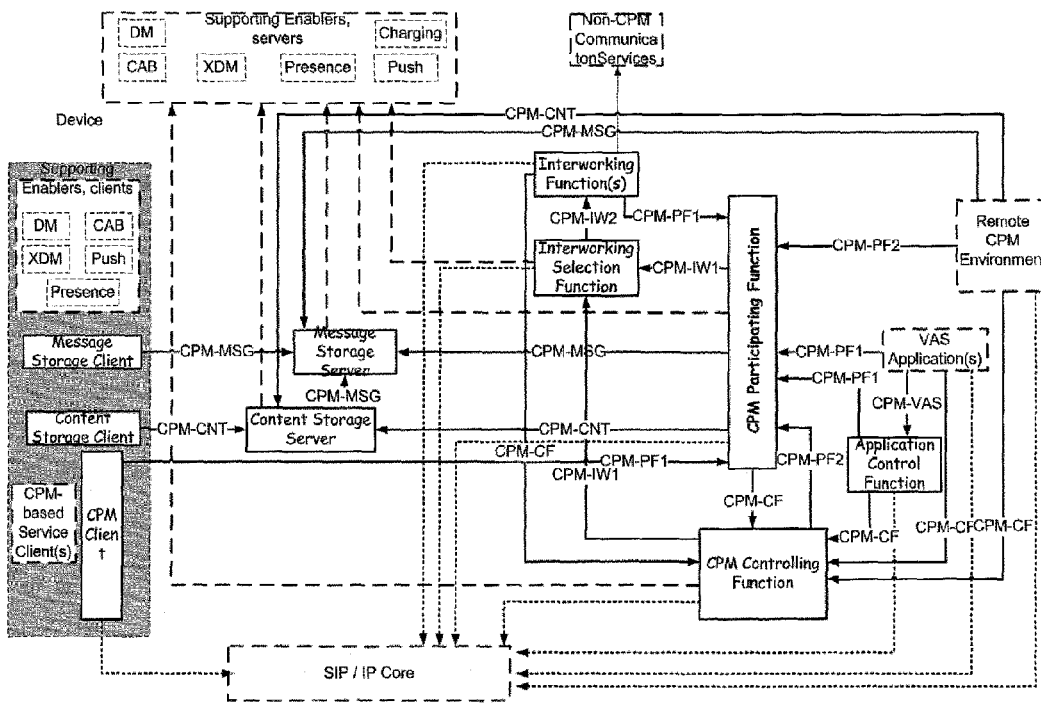
FIG. 1 is an overview of a system for a CPM session.

The present invention may have applicability to a method and apparatus for transmitting and receiving messages of a discrete media type in a CPM session. However, the present invention may not be limited to this, but applicable to any communication system and method to which the technical scope of the present invention can be applied.

The term 'sequence number' used in this specification denotes sequential identification information for determining the orders. Examples of the sequential identification information may include an incremental number and the like.

Technical terms used in this specification are used to merely illustrate specific embodiments, and should be understood that they are not intended to limit the present invention. As far as not being defined differently, all terms used herein including technical or scientific terms may have the same meaning as those generally understood by an ordinary person skilled in the art to which the present invention belongs to, and should not be construed in an excessively comprehensive meaning or an excessively restricted meaning. In addition, if a technical term used in the description of the present invention is an erroneous term that fails to clearly express the idea of the present invention, it should be replaced by a technical term that can be properly understood by the skilled person in the art. In addition, general term used in the description of the present invention should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, the element can be directly connected with the other element or intervening elements may also be present. In contrast, when an element is referred to as being "directly connected with" another element, there are no intervening elements present.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

FIG. 1 is an overview of a system for a CPM session.

1) CPM client

CPM client exists in a device, and is used to access a CPM functional component with a network-based CPM function. Other components having different functions within the device may internally communicate with the CPM client.

2) CPM Participating Function (PF)

CPM PF is a component having a user-specific function, namely, a type of server. The function may be executed in a home network of a CPM user, and called when the CPM user sends an initiation request or receives a termination request. The CPM PF may handle CPM session, CPM message and CPM media for participants who are targets to be serviced, and apply a CPM user preference and a service provider policy.

3) CPM Controlling Function (CF)

CPM CF is a function for a group communication, namely, a type of server used in a CPM group session. The CPM CF may be executed in a home network or remote network of a CPM user who initiates the group session. The CPM CF may terminate an incoming request, typically distribute a request to plural recipients, and handle a group communication.

4) Message storage server and client

A message storage server may store folders, CPM messages, a CPM session history and a CPM conversation history. Also, the message storage server may store a media object which is a part of the CPM message or CPM session history. The message storage server may execute authentication of a locally recognized user address and authentication of a request for a remote environment trusted server. In addition, the message storage server may execute search for stored resources, a synchronization function and the like.

The message storage client may manage CPM messages, a CPM conversation history and a CPM session history. Targets to be managed by the message storage client may include media objects, part of the CPM message or CPM session, stored in the message storage server, as well as local objects. Components having different functions within the device may internally communicate with the message storage client.

5) Interworking Selection Function

The interworking selection function may identify a non-CPM communication service, and select an appropriate interworking function for routing of CPM session or CPM message.

6) Interworking Function

The interworking function may provide interworking capability between a CPM-based service and a non-CPM-based service. That is, the interworking function is an entity which performs interworking, namely, an entity which performs a conversion operation, such as converting CPM into MMS or MMS into CPM.

7) CPM Chat Message

Information that is sent to one or more recipients as part of an existing CPM Session. A CPM Chat Message can contain several discrete Media (e.g. text, images, audio-clips, video-clips).

8) CPM Session

A real-time interaction between two or more Participants during which a combination of CPM Chat Messages and/or continuous Media may be exchanged.

Hereinafter, brief description will be given of definitions of terms used in this specification.

1) Internet Messaging Access Protocol (IMAP) Server/Client

The IMAP is a protocol associated with e-mail reception, operating similar to a remote file server. The IMAP is different from Post Office Protocol Version 3 (POP3) in that a mail is stored in a server without deletion when receiving the mail.

An IMAP server may send mails using the IMAP, and an IMAP client may receive mails.

2) CPM Large Message Mode

The CPM large message mode is used to send a single large CPM message by use of MSRP.

3) CPM Pager Mode

The CPM pager mode is used to send a single CPM message having a limited size (e.g., less than 1300 Byte), without requiring establishment of the MSRP session.

Hereinafter, the aforesaid message session relay protocol (MSRP) will be described in more detail. The description complies with the definition of RFC497(http://tools.ietf.org/html/rfc4975), and further details thereof are disclosed in the document.

The MSRP is a protocol for sending a series of associated instant messages under a context of a communication session.

Extremely large messages may be sent by use of the MSRP, and one message may be divided into several chunks. Each chunk may be sent by an independent MSRP SEND request. Here, each SEND request may include one chunk of the overall message. A long message may be interrupted during transmission thereof for ensuring fairness among shared transport connections. That is, if one long message is divided into several chunks, a chunk of another message may interpose during transmission of the chunks. As a result of the transmission, the generation order of the messages may not match the transmission order of the messages.

To overcome this, the MSRP uses a boundary-based framing mechanism. A start line of an MSRP request includes a specific identifier and the identifier is also used to indicate the end of the request. A flag is included at the end of an MSRP end-line so as to indicate the last chunk of data for a message or whether there are further chunks of the message. Also, a byte-range header field is included in the request so as to indicate an overall position of the chunk within the overall message. By this mechanism, even if chunks of a message are sent out of order, the original order of the chunks may be restored at a receiving end which receives the chunks.

Snippets of two SEND requests are illustrated in the following Table 1.

The snippets represent that a message including a text "abcdEFGH" by being divided into two chunks.

TABLE 1

MSRP dkei8sd SEND
Message-ID: 4564dpWd
Byte-Range: 1-*/8
Content-Type: text/plain
abcd
-------dkei38sd+
MSRP dkei8ia SEND
Message-ID: 4564dpWd
Byte-Range: 5-8/8
Content-Type: text/plain
EFGH
-------dkei38ia$ The chunking mechanism allows interruption while a sender sends the chunks. The capability of interrupting the messages allows sharing of Transmission Control Protocol (TCP) connection among a plurality of MSRP sessions. Also, the capability allows large messages to be fairly or efficiently sent without blocking other messages which share the same connection, even, the same MSRP session. A particular chunk larger than 2048-octet should be able to be interrupted. That is, if a single message generated by a user is larger than 2048-octet in size, an MSRP layer entity should unconditionally be able to chunk the message. If the single message is not chunked, chunks of another message may not be interrupted during transmission of the message. If each MSRP session uses its specific TCP connection, the realization of the MSRP may be simplified but there is a reason why such connection should be maintained. For example, a TCP peer may be a relay device for connection with many other peers. The device may scales a load better if many numbers of connections are not generated by each peer. (In the aforesaid example, it should be noticed that even if the initial chunk was smaller in size than the limit requiring interruptibility, the interruption was available for illustration.)

The SEND method is the only method used for the transmission of message contents, so the chunking mechanism may be applied only to the SEND method.

Hereinafter, description will be sequentially given of a message transmitting step and a message receiving step by a client when two clients transmit and receive messages in accordance with one embodiment of the present invention.

The client may be a CPM client, or a terminal having the CPM client function.

Figure 2:
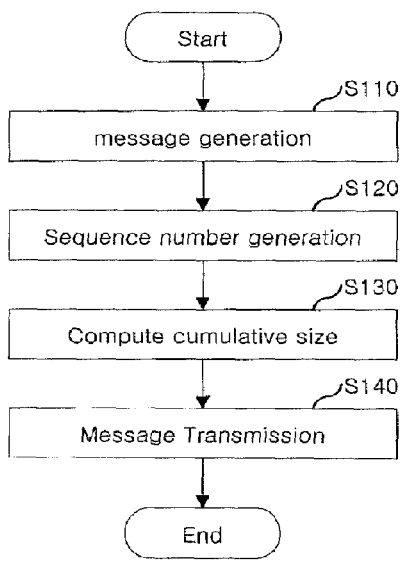
FIG. 2 is a flowchart illustrating sequential steps of a client's operation for sending a message in accordance with one embodiment of the present invention.

FIG. 2 is a flowchart illustrating sequential steps of a client's operation for sending a message in accordance with one embodiment of the present invention.

First, a message to be sent is generated by a user's manipulation (S110).

A client then generates a sequence number of the message and includes the sequence number in the message (S120). The sequence number denotes a serial number which is managed within a CPM session and is an incremental number starting from 1.

The client computes a cumulative size of every generated message so far and also includes the cumulative size in each message (S130). For example, if a first message with a sequence number 1 is 1 Kbyte in size and a second message with a sequence number 2 is 1 Mbyte in size, the cumulative size included in the first message is 1 Kbyte and the cumulative size included in the second message is 1 Kbyte+1 Mbyte. Optionally, the client may separately include a size of the current message in the current message.

The client finally sends the message (S140).

Optionally, part of messages to be sent may include the sequence number and the cumulative size. In this case, the messages including the sequence number and the cumulative size become targets for the sum of the cumulative size.

Figure 3:
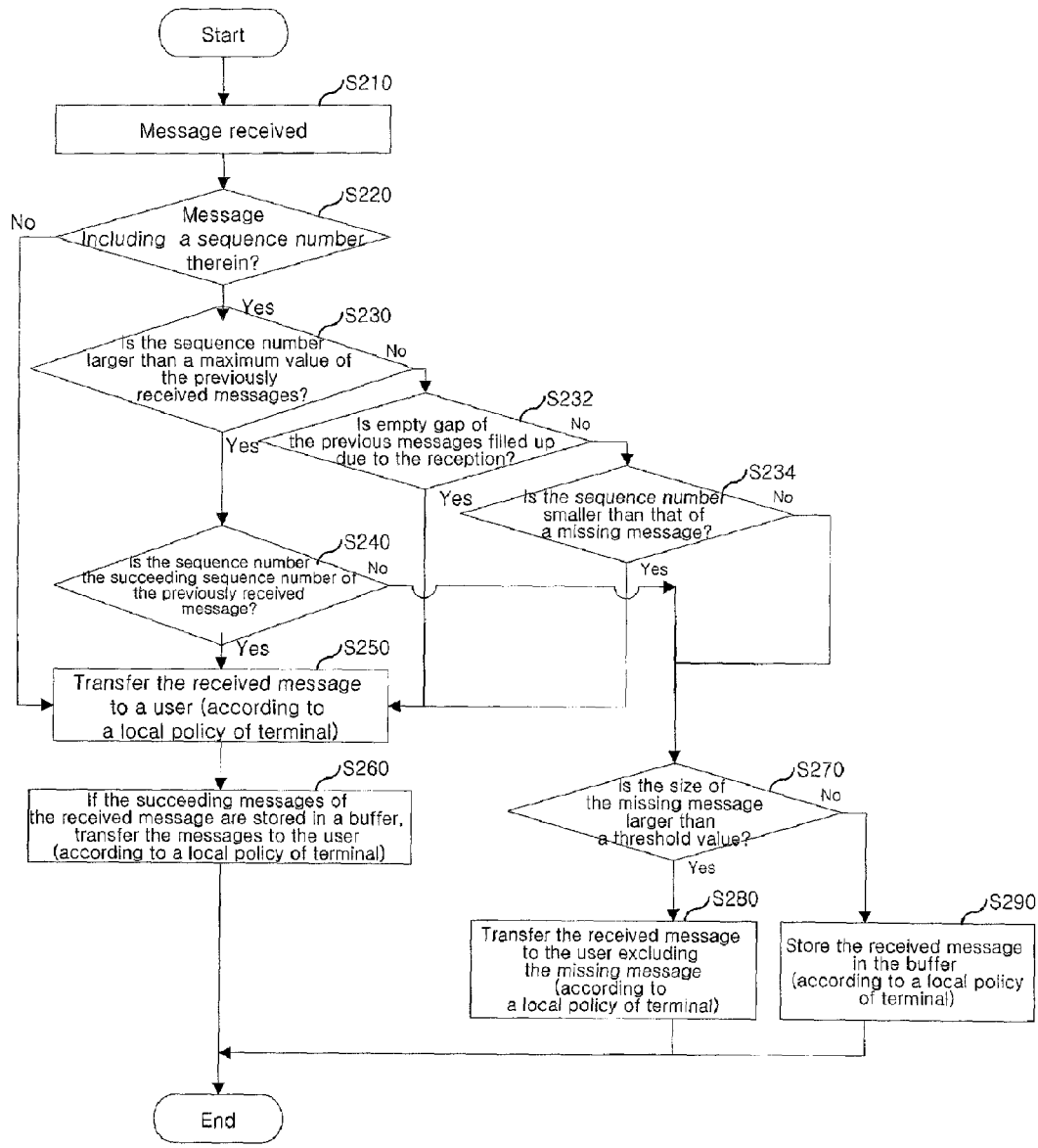
FIG. 3 is a flowchart illustrating sequential steps of a client's operation for receiving a message in accordance with one embodiment of the present invention.

FIG. 3 is a flowchart illustrating sequential steps of a client's operation for receiving a message in accordance with one embodiment of the present invention.

First, a client receives a message sent by a counter party (S210).

If an inclusion of a sequence number in a message is optional, the client checks whether the received message includes a sequence number (S220). This step may not be performed in case where every message is configured to have a sequence number.

If the sequence number is not present, the message is transferred to a user (S250). Here, since the message does not have the sequence number, exceptionally, unlike the flow shown in FIG. 3, the procedure may be terminated without performing Step S260 of determining whether the succeeding message (i.e., a message having a larger sequence number) is stored in a buffer.

If the sequence number is present, the procedure proceeds to the next step S230.

The client then compares the sequence number with the maximum value of the sequence numbers of messages which were previously received (S230).

Figure 4:
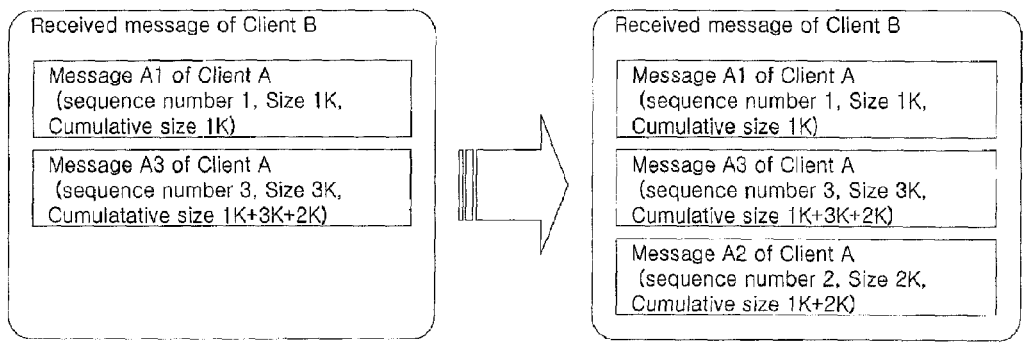
FIG. 4 is an exemplary view of a missing message received.

If the sequence number is smaller than the maximum value according to the comparison result, the message is a missing message. A missing message denotes a message which has not been sent yet, for all that a message having a larger sequence number than its own sequence number was sent to a receiving client. FIG. 4 exemplarily illustrates the reception of the missing message. In this occasion, the procedure goes to an examination step S232.

If the sequence number is larger than the maximum value according to the comparison result, the client examines whether the message is a message subsequent to the last received message of the previously received messages (S240). That is, it is examined whether the sequence number of the received message is a number one greater than the maximum value. The examination means checking whether a new missing message is generated due to the reception of the message. Optionally, the examination may be replaced with checking whether there is a missing message up to the sequence number of the received message.

If the received message is checked as a message with the succeeding sequence number, the message is transferred to a user (S250). The transfer may be executed in various manners, such as outputting on a screen and the like. Also, since the sequence number is larger than the maximum value, exceptionally, unlike the flow shown in FIG. 3, the procedure may be terminated without performing Step S260 of determining whether the succeeding message is stored in a buffer.

Figure 5:
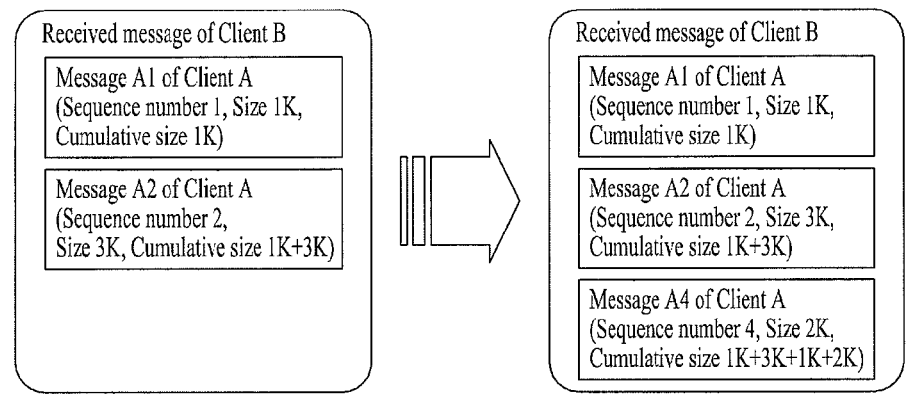
FIG. 5 is an exemplary view of a missing message generated.

If the received message is not checked as the message with the succeeding sequence number, it indicates that there are another missing messages. FIG. 5 exemplarily illustrates the generation of the missing message. In this case, the procedure proceeds to Step S270 of comparing the size of the missing message with a threshold value, which will be explained later.

If the sequence number of the received message is smaller than the maximum value, the client examines whether an empty gap of the existing messages is fully filled up consequent to the reception of the message (S232). That is, it is examined whether the received message is the only missing message of the client.

If it is examined that the empty gap is fully filled up consequent to the reception of the message, the message is transferred to the user (S250). Also, if a succeeding message of the message (i.e., a message having a larger sequence number than that of the message) is stored in the buffer without transfer, the message stored in the buffer is also transferred to the user (S260).

If the empty gap is not completely filled up consequent to the reception of the message, the sequence number of the message is compared with the sequence number of the missing message (S234).

If the sequence number of the message is smaller than that of the missing message according to the comparison result, this indicates that the preceding messages of the message have already been sent to the user. Hence, the message is delivered to the user (S250). Also, messages present between the message and the missing message among the messages stored in the buffer are delivered to the user as well (S260).

The missing message, as the object to be compared, may be a message having the smallest sequence number among missing messages.

If the sequence number of the received message is larger than that of the missing message according to the comparison result or if it is determined at the procedure at S240 that the message is not a message subsequent to the last received message of the previously received messages ( ), the procedure goes to Step S270 of comparing the size of the missing message with a threshold value. The size of the missing message may be identified by comparing cumulative sizes of two messages respectively having preceding and succeeding sequence numbers of the sequence number of the missing message.

Upon performing the step (S270) of comparing the size of the missing message with the threshold value, whether to transfer the received message is determined according to the comparison result.

If the size of the missing message is larger than the threshold value, the client transfers the received message to the user without waiting for the arrival of the missing message (S280). The client may notify the user of the existence of the missing message upon the transfer. The notification may be realized as an additional operation on a user interface (UI). For instance, the client may represent the missing message a dotted outline without contents therein.

If the size of the missing message is smaller than the threshold value, the client does not immediately transfer the received message. Rather, the client waits for the arrival of the missing message and sends the arrived missing message to the user, thereafter transferring the received message. Hence, the message is stored in an internal buffer.

If other messages are present between the missing message and the received message (i.e., if the missing message and the received message are not sequential to each other), the received message may be processed the same as processing of the other messages. That is, if the other messages are stored in the buffer, the received message is stored in the buffer as well, and if the other messages are transferred to the user, the received message is transferred to the user as well.

If two or more missing messages are present, the total size of the missing messages may be regarded as a size to be a target for the comparison.

The transferring step (S250, S260 and S280) and the storing step (S290) may be determined according to the local policy of the terminal.

Hereinafter, a case of message transmission and reception between clients within a group session will be described.

The group session denotes that two or more clients transmit and receive messages, and a message sent by one client is sent to every other client.

Simply, the aforesaid method employed when two clients transmit and receive messages may extensibly be applied. This extensible method, in view of message transmission, is different from the aforesaid method in that the same message is sent to each of all other clients. Also, this extensible method, in view of message reception, is different from the aforesaid method in that each client should manage the sequence number, the missing message, the buffer and the like for each counter client.

Hereinafter, a group session using a server will be described.

In order to manage the orders among messages sent by different clients, one converged sequence number should be allocated to every message generated by each client. So, for a group session using a server, each client sends a message to the server. Upon reception of the message, the server computes a converged sequence number and a cumulative size appropriate for the group session for each received message, and then sends the message having the converged sequence number and the cumulative size to other clients.

The server may be a CPM CF of OMA CPM.

Figure 6:
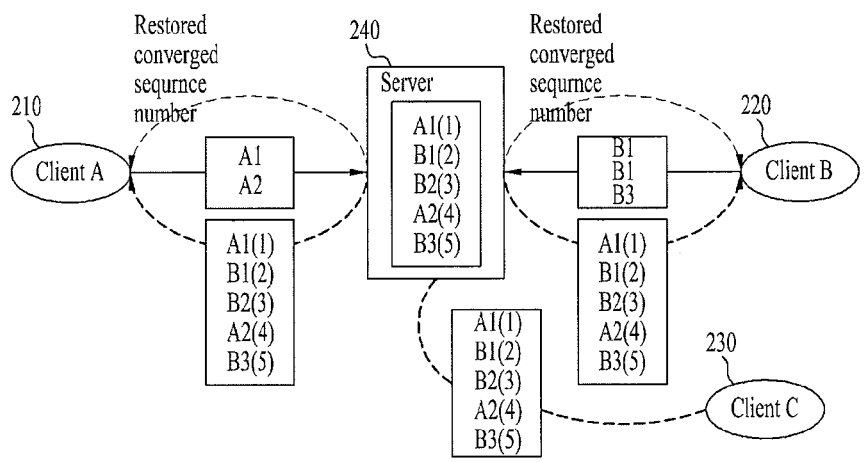
FIG. 6 is a view illustrating a group session using a server in which three clients participate in accordance with one embodiment of the present invention.

FIG. 6 is a view illustrating a group session using a server in which three clients participate in accordance with one embodiment of the present invention.

In the group session, Client A 210, Client B 220 and Client C 230 transmit and receive messages via a server 240.

A solid line indicates a message transmission by a client. A box overlaid with the solid line indicates a message sent. Client A 210 sends messages A1 and A2. The number allocated to each message indicates a sequence number given by a client. Client B 220 sends message B1, B2 and B3. Client C 230 does not send a message.

A dotted line indicates a message reception by a client. A box overlaid with the dotted line indicates a message received. A message represented with italic letters indicates a message excluded from reception because it is generated by a corresponding client itself. The number in the bracket is a converged sequence number allocated to each message. Client A 210 receives the messages B1, B2 and B3 excluding the messages sent by itself among the overall messages A1, B1, A2, B2 and B3. Client B 220 receives the messages A1 and A2. Client C 230 receives all of the messages A1, B1, A2, B2 and B3 because it has not sent any message. A dash-dotted line indicates a converged sequence number restored to a client. The restored converged sequence number will be described in detail later.

A box within the server 240 indicates a message received by the server 240.

Hereinafter, description will be given of operations of the clients and the server upon executing the message transmission and reception with the configuration illustrated in the embodiment of FIG. 6.

1) A step in which the clients 210, 220 and 230 send messages will be described.

The operations of the clients upon a message transmission is the same as the message transmission step when a session is established between two clients, which has been described before, so the repetitive description will be omitted.

2) A step in which the server 240 receives a message and sends the message to another client will be described.

At this step, the operations of the server 240 may be divided into allocating a converged sequence number to the received message, allocating a converged cumulative size to the received message and notifying the converged sequence number to the client which has sent the message.

Figure 7:
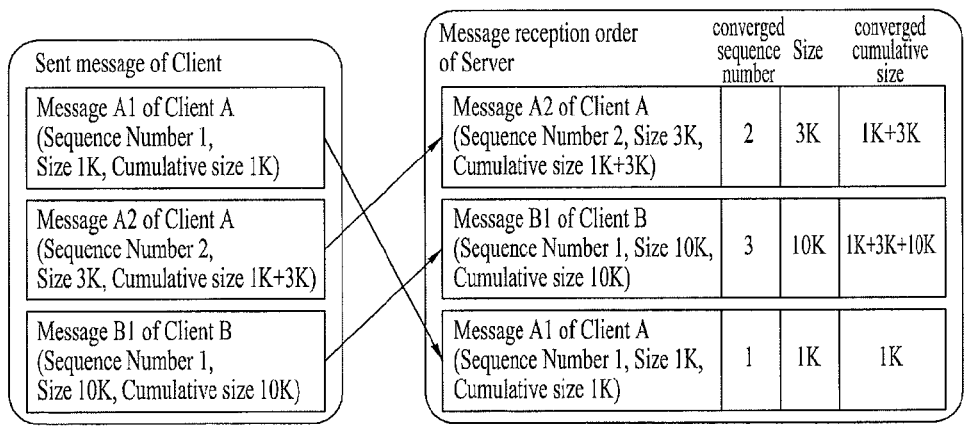
FIG. 7 is a view illustrating one embodiment in which when clients A and B send messages A1, A2 and B1, a converged sequence number and a converged cumulative size are allocated to each of the messages.

FIG. 7 illustrates one embodiment in which when the clients A and B have sent the messages A1, A2 and B2, each message is allocated with a converged sequence number and a cumulative size.

Referring to FIG. 7, the clients A and B sequentially send the messages A1, A2 and B1. Each message includes information relating to a sequence number, a size and a cumulative size given by the clients A and B.

The messages A1, A2 and B1 arrive at the server in the order of A2, B1 and A1.

2-1) Allocation of Converged Sequence Number

Basically, the server allocates a converged sequence number to each received message in the order they received. However, the order among the messages sent by the same client should be maintained. That is, as illustrated in FIG. 7, when the messages are received in the order of A2, B1 and A1, if the converged sequence numbers 1, 2 and 3 are simply allocated in the arrival order, a problem occurs that the message A1 generated first by the client A has the converged sequence number 3 and the message A2 generated later has the converged sequence number 1.

In a state where a message generated by one client was not arrived, if a message generated later by the same client is received, a method of securing a converged sequence number for the non-arrived message may be employed. If there are two or more non-arrived messages, the converged sequence number for each of the messages may be secured and the succeeding converged sequence number may be allocated to the earlier received message.

Referring to FIG. 7, upon reception of the message A2 first of all, since the sequence number of the message A2 is 2, the server may recognize that the message A1 with the sequence number 1 generated by the client A has not been received yet. Accordingly, the server secures the converged sequence number 1 beforehand for the message A1 and allocates the subsequent converged sequence number 2 to the message A2. Afterwards, upon reception of the message B1, since the sequence number of the message B1 is 1, the server allocates the subsequent converged sequence number 3 to the message B1. Then, upon reception of the message A1, the server allocates the secured converged sequence number 1 to the message A1.

The method for allocating the converged sequence number is merely illustrative, so another method for keeping orders among messages sent by the same client may alternatively be employed for this procedure.

2-2) Allocation of Converged Cumulative Size

The server allocates a converged cumulative size to each received message in addition to the allocation of the converged sequence number.

The server sums up sizes of every message which has been received up to the moment so as to allocate a converged cumulative size to each received message.

If the same client generates several messages and the later generated message (i.e., a message with a larger sequence number) has arrived earlier than the earlier generated message (i.e., a message with a smaller sequence number), there may be a problem in computing the converged cumulative size.

In a state where an earlier generated message by one client was not received, if a later generated message by the same client is received, the server can estimate the converged cumulative size including the size of the non-received message from the cumulative size of the received message. Even if two or more messages have not been arrived yet, the server can estimate the converged cumulative size of the arrived message from the cumulative size of the arrived message.

Still referring to FIG. 7, upon reception of the message A2 first of all, since the converged sequence number allocated to the message A2 is 2, the converged cumulative size of the message A2 is the same as the sum of sizes of the messages corresponding to the converged sequence number 1 and the converged sequence number 2, namely, the sum of the sizes of the messages A1 and A2, which can be estimated from the cumulative size of the message A2. Then, upon reception of the message B1, since the converged sequence number allocated to the message B1 is 3, the converged cumulative size of the message B1 is the value obtained by adding the converged cumulative size of the message A2 with the converged sequence number 2 to the size of the message B1. Finally, upon reception of the message A1, since the converged sequence number 1 secured for the message A1 is 1, the size of the message A1 becomes the converged cumulative size of the message A1.

2-3) Converged Sequence Number Feedback for Message Sent by Each Client

In this embodiment, after receiving a message from the client, the server informs the client of a converged sequence number allocated to the message.

After a client sends a message generated by itself, if the client receives a message generated by another client from the server, the client checks a converged sequence number of the received message. If the converged sequence number is not sequential with a converged sequence number of a previously received message, the client should be able to determine whether the discontinuity results from the message generated by itself or from non-arrival of another message, which is generated by another client and has an earlier converged sequence number. Hence, upon reception of the message from the client, the server may feedback the converged sequence number allocated to the received message to the client, thereby allowing the client's determination.

For instance, it is assumed that a client, which received a message with a converged sequence number 3, has generated a new message and sent the new message to the server. If the client has received a message with a converged sequence number 5, the client should determine whether the message sent by itself has a converged sequence number 4 or it has not received yet another message with a converged sequence number 4. If the client has received from the server the feedback that the converged sequence number 4 corresponds to the message sent by the client, the client can know the sequence number of the message sent by itself, and accordingly, recognize that it does not have to wait for receiving a message with the converge sequence number 4. If the fedback converged sequence number is larger than 6, the client may recognize that it has not received yet the message with the converged sequence number 4.

Hereinafter, the feedback method for the converged sequence number will be described in detail.

Figure 8:
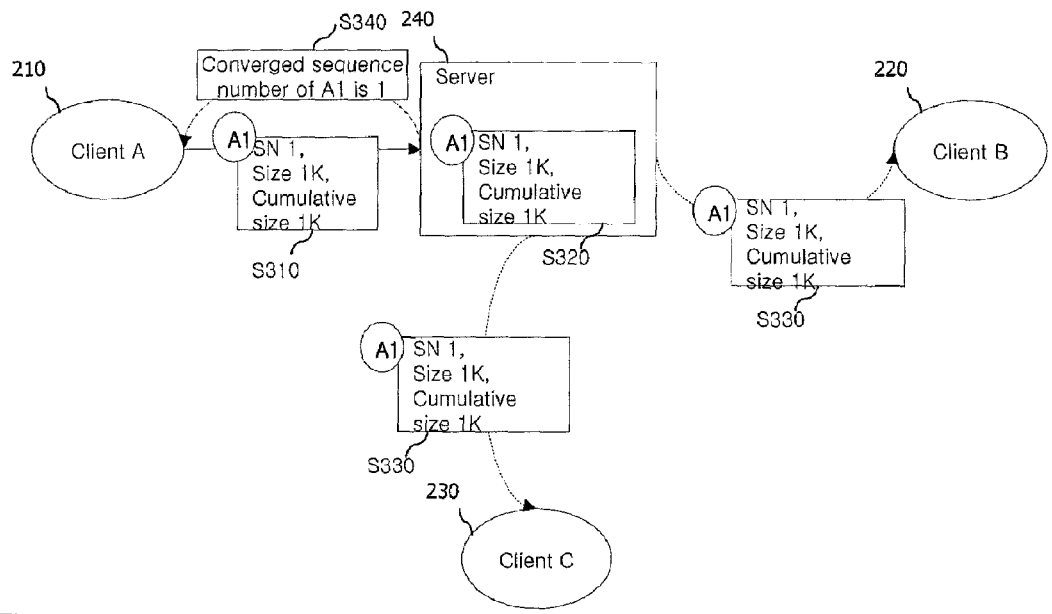
FIGS. 8 and 9 are views illustrating a step of generating a new message and restoring a converged sequence number to a client.
Figure 9:
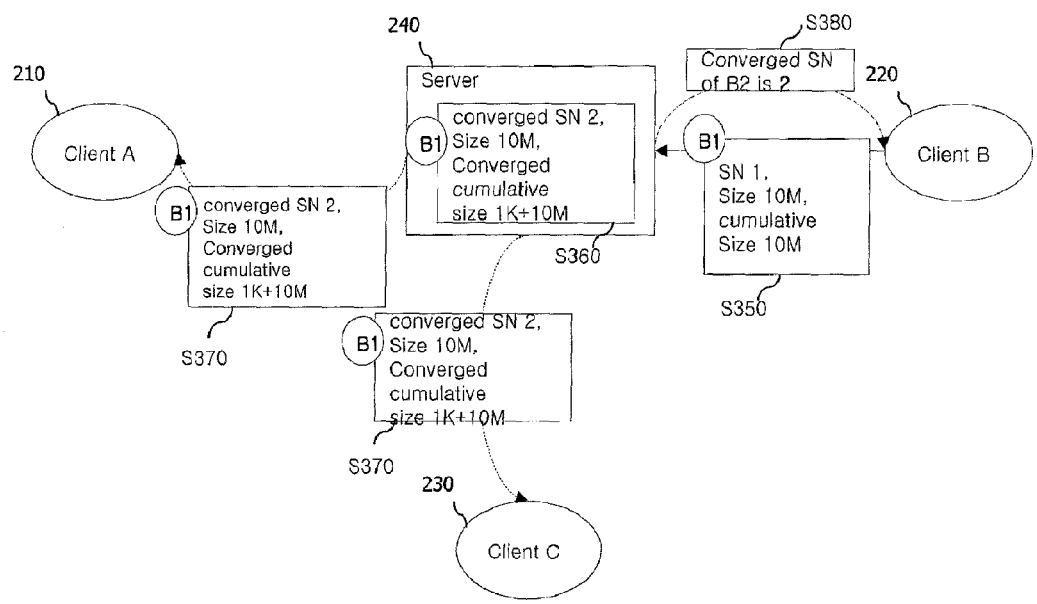

2-3-1) Method for Restoring the Converged Sequence Number to the Client by Generating a New Message FIGS. 8 to 9 are views illustrating a step of generating a new message and giving a converged sequence number back to a client.

Referring to FIG. 8, Client A 210 sends a message A1 to the server 240 (S310). A sequence number of the message A1 is 1. The message A1 is 1K in size and 1K in a cumulative size. The server 240, which has received the message A1, allocates a converged sequence number 1 and a converged cumulative size 1K to the message A1 (S320). Afterwards, the server 240 sends the message A1 to Client B 220 and Client C 230 (S330). Also, the server 240 sends a restore message including information related to the converged sequence number 1 allocated to the message A1 to Client A 210 (S340)

Referring to FIG. 9, Client B 220 sends a message B1 to the server 240 (S350). The sequence number of the message B1 is 1. The message B1 is 10M in size and 10M in a cumulative size. After receiving the message B1, the server 240 allocates a converged sequence number 2 and a converged cumulative size 1K+10M to the message B1 (S360). Afterwards, the server 240 sends the message B1 to Client A 210 and Client C 230 (S370). Also, the server 240 sends a restore message including information related to the converged sequence number 2 allocated to the message B1 to Client B 220 (S380).

An example of a message sent by a client is illustrated in the following Table 2. Also, an example of a restore message for restoring a converged sequence number to a client is illustrated in the following Table 3.

TABLE 2

MSRP d93kswow SEND
To-Path: xxx
From-Path: zzz
Message-ID: 12339sdqwer
Byte-Range: 1-137/148
Content-Type: message/cpim
To: Bob sip:bob@example.com
From: Alice sip:alice@example.com
DateTime: 2006-05-15T 15:02:31-03:00
Content-Type: text/plain
NS: cpm <urn:oma:params:cpm>
cpm.seq_num: 5
ABCB
-------d93kswow+

In Table 2, an item cpm.seq_num denotes the sequence number of the message given by the client. That is, the item cpm.seq_num denotes that the message is a message with a sequence number 5.

TABLE 3

MSRP d93kswow SEND
To-Path: xxx
From-Path: zzz
Message-ID: 12339sdqwer
Byte-Range: 1-137/148
Content-Type: message/cpim
To: Bob sip:bob@example.com
From: Alice sip:alice@example.com
DateTime: 2006-05-15T 15:02:31-03:00
Content-Type: text/plain TABLE 3-continued

```
NS: cpm <urn:oma:params:cpm>
cpm.seq_num: 5
cpm.own_seq_num_unified: 7
ABCB
-------d93kswow+
```

In Table 3, an item cpm.seq_num_unified denotes a converged sequence number of the message given by the server. That is, the restore message indicates that the message with the sequence number 5 sent by the client has a converged sequence number 7.

2-3-2) Method for Including Information on the Converged Sequence Number in a Message Generated by Another Client FIGS. 10 to 14 are views illustrating a step of including information relating to the converged sequence number in a message generated by another client for restoration.

Figure 10:
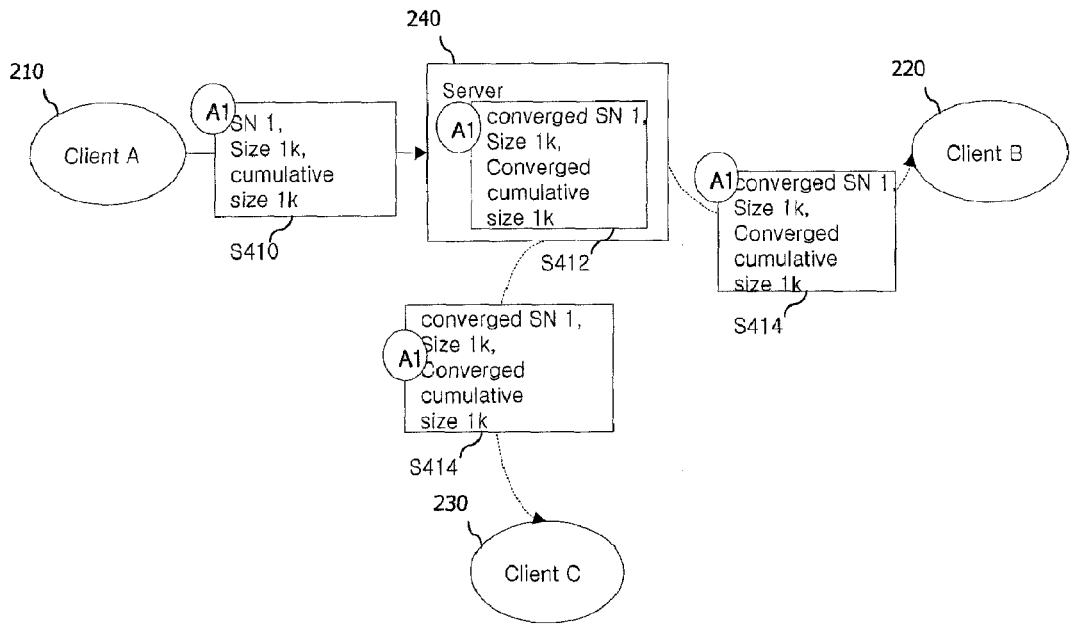
FIGS. 10 to 13 are views illustrating a step of including information relating to a converged sequence number in a message generated by another client for restoration.
Figure 11:
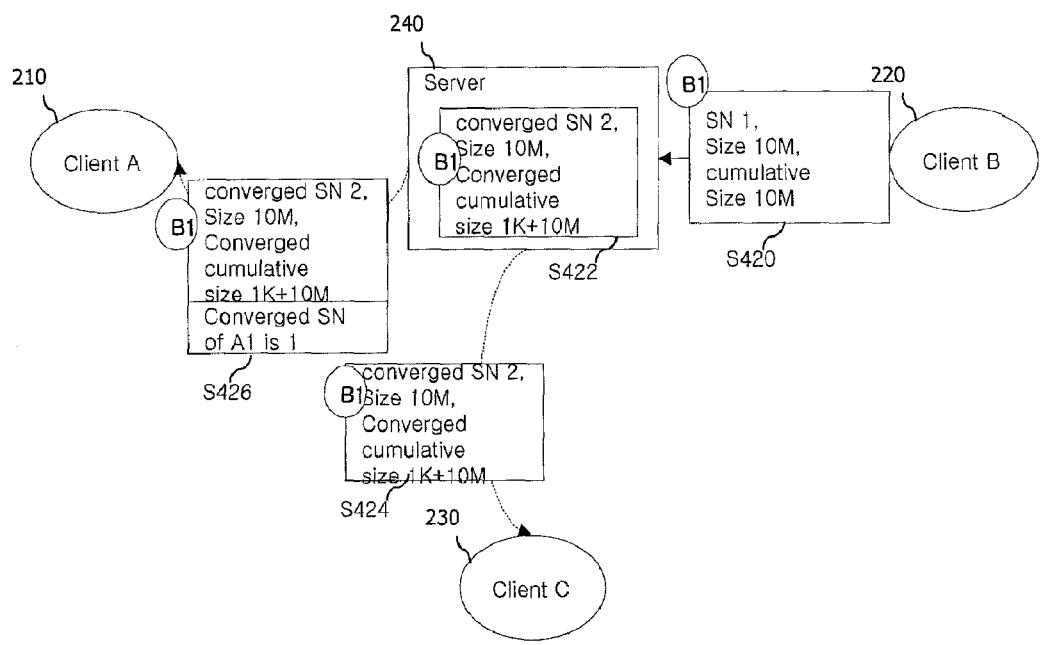

Referring to FIG. 10, Client A 210 sends a message A1 to the server 240 (S410). The sequence number of the message A1 is 1. The message A1 is 1K in size and 1K in a cumulative size. After receiving the message A1, the server 240 allocates a converged sequence number 1 and a converged cumulative size 1K to the message A1 (S412). Afterwards, the server 240 sends the message A1 to Client B 220 and Client C 230 (S414).

Afterwards, Client B 220 sends a message B1 to the server 240 (S420) as shown in FIG. 8B. The sequence number of the message B1 is 1. The message B1 is 10M in size and 10M in a cumulative size. After receiving the message B1, the server 240 allocates a converged sequence number 2 and a converged cumulative size 1K+10M to the message B1 (S422). Afterwards, the server 240 sends the message B1 to Client C 230 (S424). Also, the server 240 includes information, in the message B1, related to the converged sequence number 1 of the message A1 and sends the message B1 including the information to Client A 210 (S426). After receiving the message B1, Client A 210 can recognize that the converged sequence number 1 has been allocated to the message A1 which it has previously been sent.

Figure 12:
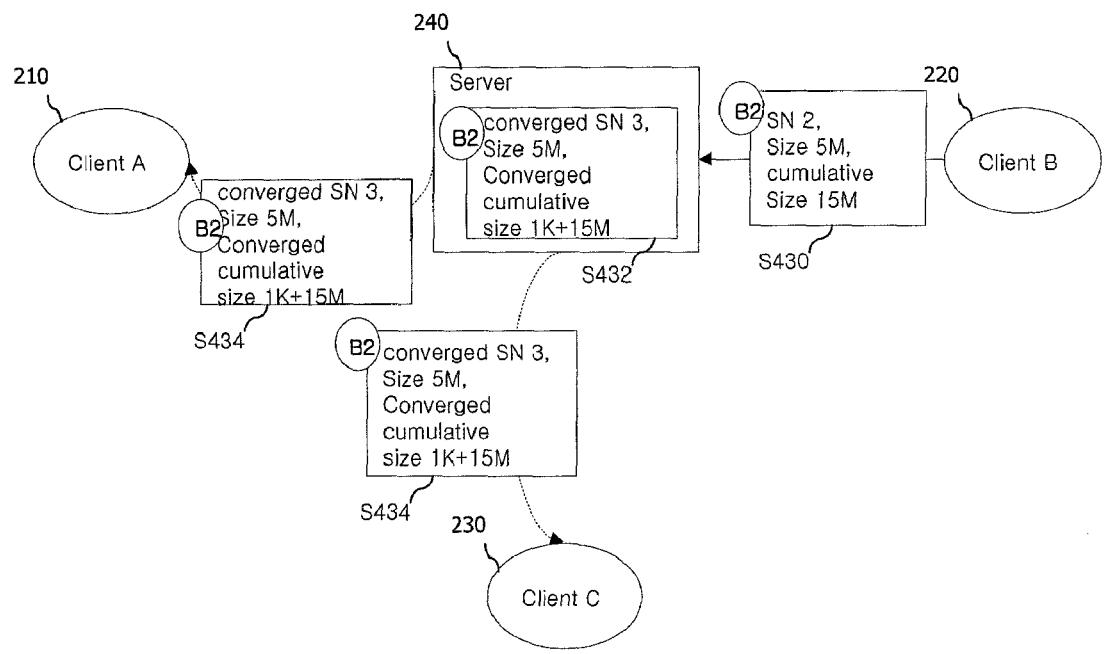

Referring to FIG. 12, Client B 220 sends a message B2 to the server 240 (S430). The sequence number of the message B2 is 2. The message B2 is 5M in size and 15M in a cumulative size. After receiving the message B2, the server 240 allocates a converged sequence number 3 and a converged cumulative size 1K+15M to the message B2 (S432). Afterwards, the server 240 sends the message B2 to Client A 210 and Client C 230 (S434). At this step, since Client B 220 has no message to receive, information relating to B1 is not sent to Client B 220.

Figure 13:
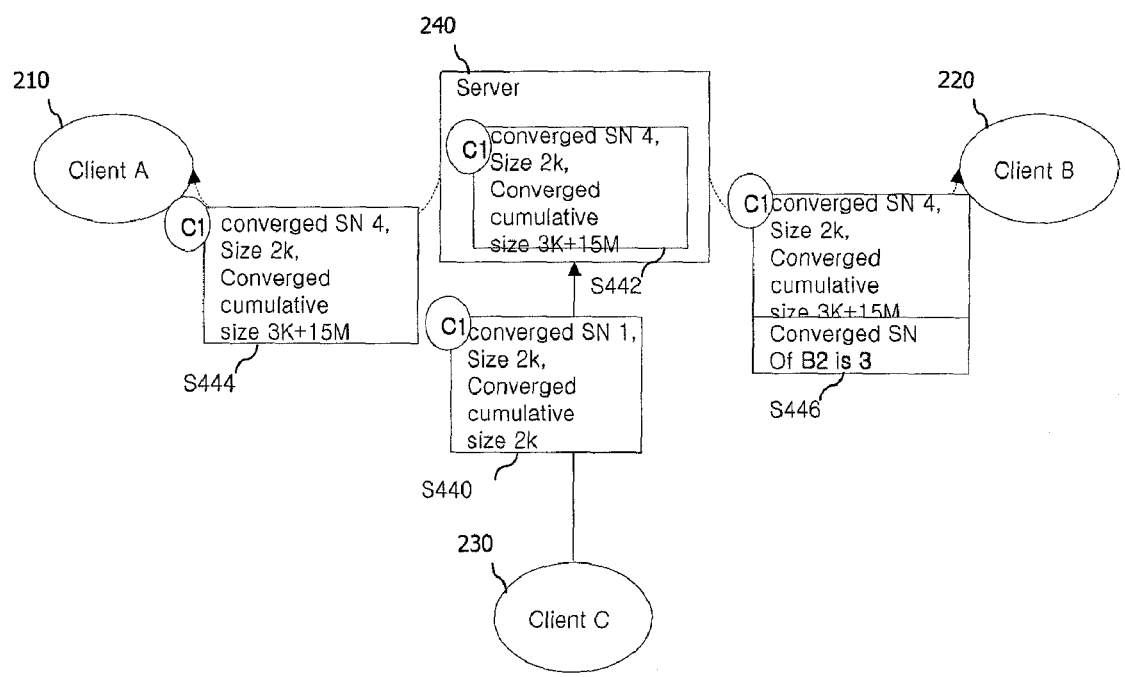

Referring to FIG. 13, Client C 230 sends a message C1 to the server 240 (S440). The sequence number of the message C1 is 1. The message C1 is 2K in size and 2K in a cumulative size. After receiving the message C1, the server 240 allocates a converged sequence number 4 and a converged cumulative size 3K+15M to the message C1 (S442). Afterwards, the server 240 sends the message C1 to Client A 210 (S444). Also, the server 240 includes information related to the converged sequence number 3 of the message B2 in the message C1, and sends the message C1 including the information to Client B 220 (S446). After receiving the message C1, Client B 220 may know that the converged sequence number 3 has been allocated to the message B2 which it has previously been sent. Here, Client B 220 has not explicitly received the information relating to the converged sequence number of the message B1. However, Client B 220 has already received the message A1 with the converged sequence number 1, and after sending the message B1, can recognize the converged sequence number 3 of the message B2. Hence, Client B 220 can recognize that the B1 has the converged sequence number 2.

Table 4 illustrates an example of a message including information related to a converged sequence number, among messages sent by the server.

TABLE 4

```
MSRP d93kswow SEND
To-Path: yyy
From-Path: zzz
Message-ID: 12339sdqwer
Byte-Range: 1-137/148
Content-Type: message/cpim
To: Bob sip:bob@example.com
From: Alice sip:alice@example.com
DateTime: 2006-05-15T 15:02:31-03:00
Content-Type: text/plain
NS: cpm <urn:oma:params:cpm>
cpm.unified_seq_num: 8
cpm.own_seq_num: 5
cpm.own_seq_num_unified: 7
ABCB
-------d93kswow+
```

In Table 4, an item cpm.unified_seq_num denotes the converged sequence number of the message. That is, Table 4 shows a converged sequence number 8 of the message. Converged sequence number information relating to the message sent by the client is represented with an item cpm.own_seq_num and an item cpm.own_seq_num_unified. cpm.own_seq_num indicates the sequence number allocated by the client to the message sent by the client itself, and cpm.own_seq_num_unified indicates the converged sequence number allocated by the server to the message. If Table 4 illustrates a message, which is generated by the client A to be sent to the client B via the server and whose contents are displayed, the message includes information that its own converged sequence number is 8 and information that the message with the sequence number 5 sent by Client B has the converged sequence number 7.

3) A step in which each client 210, 220 and 230 receives a message from the server 240 will be described.

Figure 14:
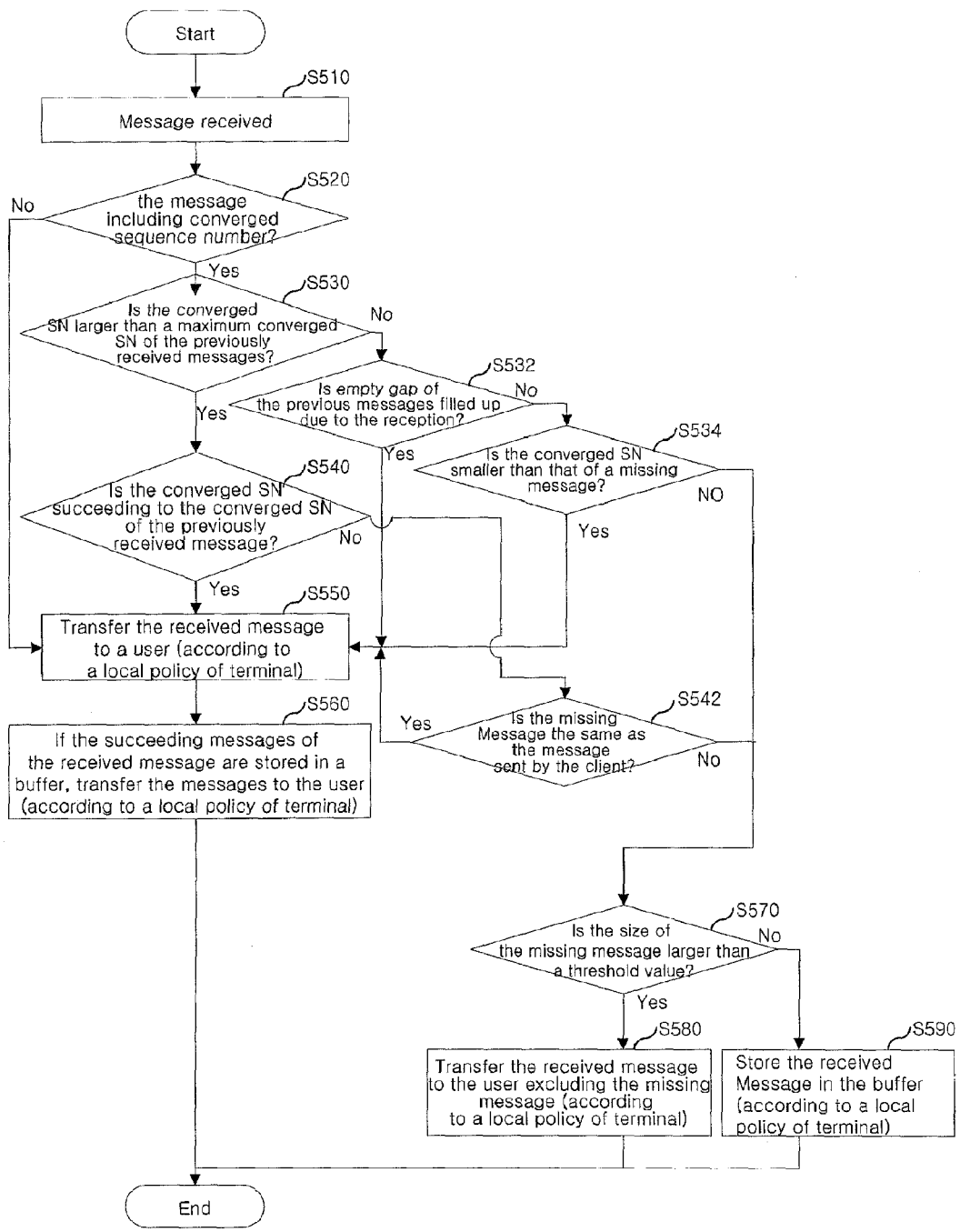
FIG. 14 is a flowchart illustrating a procedure in which a client receives a message from a server in a group session.

FIG. 14 is a flowchart illustrating a procedure of receiving a message by a client in a group session.

This receiving step may be performed similar to the message receiving step by a client in the aforesaid method of the message transmission and reception between two clients. That is, steps S210, S220, S230, S232, S234, S240, S250, S260, S270, S280 and S290 illustrated in FIG. 3 respectively correspond to steps S510, S520, S530, S532, S534, S540, S550, S560, S570, S580 and S590 illustrated in FIG. 14. Here, this receiving step is different from the aforesaid receiving step in view of a further included step S542 of determining whether a missing message is a message sent by a client itself, a process going to Step S542 and a proceeding process from Step S542.

First, a client receives a message generated by another client via a server (S510).

If an inclusion of a converged sequence number in a message is optional, the client checks whether the received message includes a converged sequence number (S520). If it is configured that every message includes the converged sequence number, the step may not be performed.

If the converged sequence number is not included, the message is transferred to a user (S550). Also, because the converged sequence number is not included, the procedure is terminated without performing Step S560 of determining whether the next sequential message (i.e., a message having a larger converged sequence number) is stored in a buffer.

If the converged sequence number is included, the procedure goes to the next step S530.

The client then compares the converged sequence number with the maximum value among converged sequence numbers of previously received messages (S530).

If the converged sequence number is smaller than the maximum value according to the comparison result, the message is a missing message. In this procedure, a missing message denotes a message which has not been received yet, for all that a message having a larger converged sequence number than its own converged sequence number has been sent to a receiving client. In this occasion, the next examination step S532 is performed.

If the converged sequence number is larger than the maximum value according to the comparison result, it is examined whether the message is a message immediately subsequent to the previously received message (S540). That is, it is examined whether the converged sequence number of the received message is a number one greater than the maximum value. Optionally, the examination may be replaced with checking whether there is a missing message up to the sequence number of the received message.

If the received message is the message having the subsequent converged sequence number according to the examination result, the message is transferred to the user (S550). The transfer may be executed in various manners such as outputting on a screen the like. Also, since the converged sequence number is greater than the maximum value, the procedure is terminated without performing the step S560 of determining whether the next sequential message is stored in a buffer.

If the received message is not the message having the subsequent converged sequence number according to the examination result, it is considered as a missing message being generated due to the reception or the succeeding converged sequence number being allocated to the message sent by the client.

In this occasion, the client checks whether the missing message is the message that it has sent (S542). That is, the client, which received the message with the converged sequence number 4, has sent the message generated by the client and thereafter received a message with the converged sequence number 6. Here, the client should check whether the converged sequence number 5 is allocated to the message that it sent or another message having the converged sequence number 5 has not been sent yet. The client may recognize the converged sequence number, which was allocated by the server to the message sent by the client, based upon the aforesaid converged sequence number feedback.

According to the check result, if the missing message is the message that the client itself has sent, the client does neither have to wait for the transmission of the missing message, nor determine whether to transfer the received message to the user. Hence, the client processes the missing message as having sent and the received message is sent to the user (S550).

If the missing message is not the message that the client has sent, the procedure goes to Step S570 of determining whether the size of the missing message is greater than a threshold value, which will be explained later. The size of the missing message may be identified by comparing the converged cumulative sizes of two messages respectively having preceding and succeeding converged sequence numbers of the sequence number of the missing message.

If there are a plurality of target missing messages to be checked, the client performs the check for each of the missing messages and thereby processes the message that it has sent as having already sent. In this case, if all of the missing messages are messages that it has sent, the client transfers the received message to the user (S550), and if not, the procedure goes to Step S570 of determining whether the size of a missing message that the client has not sent is greater than the threshold value.

If the converged sequence number of the received message is smaller than the maximum value, the client examines whether an empty gap of the existing message is fully filled up consequent to the reception of the message (S532). That is, it is examined whether the received message is the only missing message of the client.

If it is examined that the empty gap is fully filled up consequent to the reception of the message, the message is transferred to the user (S550). Also, if a message subsequent to the message (i.e., a message having a greater converged sequence number than that of the message) is stored in the buffer without delivery, the message stored in the buffer is also sent to the user (S560).

If the empty gap is not completely filled up consequent to the reception of the message, the converged sequence number of the message is compared with the converged sequence number of a missing message (S534).

If the converged sequence number of the message is smaller than that of the missing message according to the comparison result, it indicates that the preceding messages of the message have already been sent to the user. Hence, the message is delivered to the user (S550). Also, messages present between the message and the missing message among the messages stored in the buffer are delivered to the user (S560).

The missing message, as the target for the comparison, may be a message having the smallest converged sequence number among missing messages.

If the converged sequence number of the received message is larger than that of the missing message according to the comparison result, the procedure goes to Step S570 of comparing the size of the missing message with the threshold value. The size of the missing message may be identified by comparing the converged cumulative sizes of two messages respectively having preceding and succeeding converged sequence numbers of the sequence number of the missing message.

Upon performing the step (S570) of comparing the size of the missing message with the threshold value, whether to deliver the received message is determined according to the comparison result.

If the size of the missing message is greater than the threshold value, the client delivers the received message to the user without waiting for the arrival of the missing message (S580). The client may notify the user of the existence of the missing message upon the delivery. The notification may be realized as an additional operation on a user interface (UI). For instance, the client may represent the missing message with a dotted line.

If the size of the missing message is smaller than the threshold value, the client does not immediately transfer the received message, but delivers the arrived missing message to the user and thereafter transfer the received message. Hence, the message is stored in an internal buffer.

If other messages are present between the missing message and the received message (i.e., if the missing message and the received message are not sequential to each other), the received message may be processed the same as processing of the other messages. That is, if the other messages are stored in the buffer, the received message is stored in the buffer as well, and if the other messages are transferred to the user, the received message is transferred to the user as well.

If two or more missing messages are present, the total size of the missing messages may be regarded as a size to be a target for comparison.

The transferring steps S550, S560 and S580 and the storing step S590 may be determined according to the local policy of the terminal.

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

The invention claimed is:

1. A method for transmitting and receiving messages via a server through a group session in which a plurality of terminals participate, the method performed by a first terminal of the plurality of terminals and comprising:
   generating and transmitting, by the first terminal to the server, a message to be transmitted to terminals of the plurality of terminals other than the first terminal, wherein the transmitted message has a terminal-specific sequence number assigned by the first terminal and a cumulative size;
   receiving, by the first terminal from the server, a restore message including information related to a first converged sequence number assigned by the server and allocated to a message which the first terminal has transmitted most recently;
   receiving, by the first terminal, a message from the server;
   wherein the received message was originally generated and transmitted by one of the other terminals,
   wherein the received message includes a second converged sequence number assigned by the server and allocated to the received message, and a converged cumulative size of the received message, and
   wherein the received message is one of a plurality of messages divided from an original message, and is transmitted using a message session relay protocol (MSRP);
   checking, by the first terminal, if one or more new missed messages have occurred due to the received message;
   wherein if the one or more new missed messages have occurred due to the received message, the method further comprises:
      checking if the one or more new missed messages were originally generated and transmitted by the first terminal to determine whether to output the received message or store the received message by comparing an expected converged sequence number of the one or more new missed messages with the first converged sequence number,
      wherein the expected converged sequence number is between the second converged sequence number of the received message and the highest converged sequence number of messages which the first terminal has already received, and
      wherein the one or more new missed messages are checked to have been originally generated and transmitted by the first terminal when the expected converged sequence number and the first converged sequence number have been determined as being the same;
      if the one or more new missed messages were originally generated and transmitted by the first terminal, outputting the received message;
      if the one or more new missed messages were not originally generated and transmitted by the first terminal, estimating a total size of the one or more new missed messages based upon the converged cumulative size of the received message and converged cumulative size of the messages already received by the first terminal in order to determine how to process the received message;
      if the estimated total size of the one or more new missed messages is greater than a predefined threshold value, outputting the received message; and
      if the estimated total size of the one or more new missed messages is not greater than the predefined threshold value, storing the received message in an internal buffer of the first terminal.

2. The method of claim 1, wherein the outputting of the received message is performed without waiting for arrival of remaining missed messages.

* * * * *